Patented Sept. 22, 1942

2,296,315

UNITED STATES PATENT OFFICE 2,296,315

LUBRICATING COMPOSITION

William J. Sparks, Cranford, and Donald C. Field, Roselle Park, N. J., assignors to Standard Oil Development Company, a corporation of Delaware No Drawing. Application October 18, 1938, Serial No. 235,630

9 Claims. (Cl. 252—52)

This invention relates to the new resinous or gummy compositions of matter having desirable properties in that they are readily soluble in hydrocarbon oils including lubricating oil, and when dissolved in a lubricating oil, increase the viscosity thereof and also improve the so-called "viscosity index," all as hereinafter more fully described and explained.

The polymerization of olefines or di-olefines in the presence of metallic halides, such as boron trifluorides employed as catalysts, has been accomplished prior to this invention. It has also been suggested to copolymerize the acids of China-wood oil with olefines and the product thereby formed was found to be soluble in hydrocarbon oils.

It has now been discovered that China-wood oil or oiticica oil or any glyceride having a system of conjugated double bonds, may be copolymerized with olefines or di-olefines, in the presence of a metallic halide, such as boron fluoride or aluminum chloride, to form a product which is thick and gummy, which is readily soluble in hydrocarbon oils including lubricating oil, and when dissolved therein serves to increase the viscosity and the viscosity index of the said lubricating oil.

In order to more fully explain the nature and purpose of this invention, the following specific examples are given by way of illustration, but it is to be understood that the invention is not limited to the specific details set forth therein and that others familiar with this art will readily perceive numerous modifications which fall within the spirit of this invention. For instance, while the below examples describe the invention in terms of isobutylene, any mono-olefine or di-olefine may be used. As to the temperatures maintained during polymerization, while those substantially below 0° C. are preferred, the reaction may be carried out at or above 0° C.

Example 1

A valuable product is obtained by first dissolving 20 grams of tung oil in 200 cc. of "Varsol" (aluminum chloride treated), "Varsol" being a solvent oil produced by extracting a naphtha cut of hydrocarbon oil, i. e., a fraction boiling within the range 350° to 500° F. with $SO_2$ and subsequently removing the $SO_2$ by suitable means, such as by evaporation. The said "Varsol" therefore contains a substantial quantity of aromatic compounds. The solution of tung oil in "Varsol" is introduced into a suitable receptacle, such as a flask, equipped with inlet and outlet tubes and also with a stirring device. The temperature of the tung oil solution is lowered to about −10° C. and 40 cc. of liquid isobutylene is added and thereafter 10 grams of gaseous boron fluoride is led into the solution slowly, while constantly stirring the mixture, during a period of several minutes, say 5 minutes. The resultant solution is then thoroughly treated with water. The treated solution is then evaporated to dryness to give a gummy, resinous mass which, upon analysis, showed the following composition:

|   | Per cent |
|---|---|
| C | 78.97 |
| H | 11.54 |
| O | 8.92 (by difference) |
| Ash | 0.57 |
|   | 100.00 |

From the above analysis, it is obvious that a copolymer was formed, since polymerized isobutylene, of course, contains no oxygen and, furthermore, since tung oil contains about 11% oxygen. On the basis, therefore, of the above analysis, it is clear that the polymer consisted of about 81% poly-tung oil and about 19% of polymerized isobutylene.

$$\frac{(8.92}{11} \times 100\% = 81\% \text{ approximately})$$

Example 2

20 grams of tung oil are dissolved in 200 grams of solvent and the solution, cooled to −40° C., is placed in a flask constructed as in the preceding example. 40 cc. of liquid isobutylene is added and boron fluoride is conducted into the solution as in the preceding example.

Example 3

20 grams of tung oil are dissolved in 200 grams of chloroform cooled to −78° C. 40 cc. of liquid isobutylene is added. 100 cc. of a methyl chloride solution of $AlCl_3$ (0.3%) is then added with stirring. After standing for several minutes, say 10 minutes, to complete the reaction, 200 cc. alcohol is added to precipitate the co-polymer. The polymer is then dissolved in benzene and re-precipitated with alcohol at 50° C. in order to remove traces of occluded tung oil. Analytical data showed C, 83.57%; H, 13.97%; O, 2.46%. 2% of the co-polymer is dissolved in a lubricating oil giving the below results:

|   | Original oil | 2% co-polymer added |
|---|---|---|
| Saybolt viscosity @ 100° F | 275 | 749 |
| Saybolt viscosity @ 210° F | 45.9 | 78 |
| Saybolt viscosity index | 13 | 101 |

Example 4

20 grams of oiticica were dissolved in 200 cc. of ethyl chloride and the solution was cooled to −79° C. with dry ice. 80 grams of gaseous isobutylene was added and the mixture was polymerized with an aluminum chloride-ethyl chloride catalyst, which catalyst was also cooled to −79° C. The mixture was permitted to stand for several minutes, say 10 minutes, while stirring and was then purified in the following manner: The reaction product was dissolved in benzene and precipitated with chemically pure acetone. This procedure was repeated three times to remove any unreacted oiticica oil present. The product finally obtained was dried at 100° C. and analyzed. The analysis showed that the co-polymer consisted of 19% oiticica oil and 81% isobutylene. The oiticica oil-isobutylene polymer when dissolved in lube oil gave the following results:

| Oil | Viscosity @ 100° F. | Viscosity @ 210° F. | Viscosity index |
|---|---|---|---|
| Sun 20 W | 275.8 | 45.9 | 13 |
| Sun 20 W + 2% co-polymer | 410.9 | 56.5 | 84 |

In order to show the superior results obtained by using tung oil-olefine co-polymers as lube oil viscosity index improvers, as compared with (1) the simple tung oil polymer, (2) the co-polymer of olefine-tung oil acids, and (3) polymerized tung oil acids, the following experimental results are given:

*Experiment 1*

To prepare the tung oil acids-isobutylene co-polymer, 200 grams of tung oil acids are dissolved in 200 grams of "Varsol" and placed in a flask constructed as described in Example 1. 40 cc. of liquid isobutylene is then added to the said solution which has been cooled to about −10° C. and 10 grams of gaseous boron fluoride is led into the solution slowly, while constantly stirring the mixture, during a period of 5 minutes. The resultant solution was then thoroughly treated with water. The treated solution was then evaporated to dryness.

*Experiment 2*

To prepare the simple tung oil acids-polymer, 200 grams of tung oil acids were polymerized under the same conditions as in Experiment 1, except omitting the isobutylene. The polymer was washed and dried.

*Experiment 3*

To prepare the simple tung oil polymer, 200 grams of tung oil is polymerized as in Example 1, except omitting the isobutylene, and the product purified as therein.

*Experiment 4*

In this experiment, 20 grams respectively of (a) tung oil and isobutylene co-polymer, (b) copolymerized tung oil acids and isobutylene, (c) polymerized tung oil acids, and (d) polymerized tung oil respectively were each dissolved in 4 separate portions of 1000 grams each of a lubricating oil called Sun 20 W and each portion of oil tested as to viscosity at 100° F. and 210° F., and the viscosity index was also determined. The following results were obtained:

|  | Viscosity @ 100° F. | Viscosity @ 210° F. | Viscosity index |
|---|---|---|---|
| Sun 20 W (alone) | 275 | 45.9 | 13 |
| Containing isobutylene—tung oil co-polymer (Example 1 product) | 307 | 48.2 | 39 |
| Tung oil polymer (Experiment 3 product) | 253 | 45.6 | 30 |
| Tung oil acid co-polymer (Experiment 1 product) | 255 | 46.1 | 25 |
| Tung oil acid polymer (Experiment 2 product) | 249 | 45.3 | 26 |

It will be noted that the co-polymer of isobutylene and tung oil gave a product which when dissolved in the lubricating oil imparted to the latter a viscosity index of 39 which was considerably higher than the tung oil acid-isobutylene co-polymer, or the simple polymers of tung oil or its acids. Attention is also directed to the product of Example 3 dissolved in lubricating oil which gave a product having a viscosity index of 101.

To recapitulate, the present invention relates to a new composition of matter which is produced by co-polymerizing a glyceride oil containing a system of conjugated double bonds in the acid radical such as tung oil or oiticica oil or any eleostearin with olefines, such as isobutylene, in the presence of a metal halide. The reaction may be carried out at ordinary room temperature and at ordinary pressure, but preferably below the boiling point of isobutylene. The product thus obtained is readily soluble in hydrocarbon oils including lubricating oils at ordinary atmospheric temperatures. It confers on the lubricating oil in which it is dissolved a marked improvement in the viscosity index.

We claim:

1. A lubricating oil containing a co-polymer of an eleostearin and an olefine.
2. A lubricating oil containing a co-polymer of oiticica oil and an olefine.
3. A lubricating oil containing a co-polymer of tung oil and an olefine.
4. A lubricating oil containing a co-polymer of eleostearin and isobutylene.
5. A lubricating oil containing a co-polymer of tung oil and isobutylene.
6. A lubricating oil containing a co-polymer of China-wood oil and an olefine, reacted together in the presence of a catalyst at low temperatures.
7. A lubricating oil containing a co-polymer of oiticica oil and an olefine, reacted together in the presence of a catalyst at low temperatures.
8. A lubricating oil containing a co-polymer of China-wood oil and isobutylene, reacted in a methyl chloride solution of AlCl₃ at temperatures substantially below 0° C.
9. A lubricating oil containing a co-polymer of oiticica oil and isobutylene, reacted in a methyl chloride solution of AlCl₃ at temperatures substantially below 0° C.

WILLIAM J. SPARKS.
DONALD C. FIELD.